US009466296B2

(12) United States Patent
Kaplan et al.

(10) Patent No.: US 9,466,296 B2
(45) Date of Patent: Oct. 11, 2016

(54) INITIATION OF ACTION UPON RECOGNITION OF A PARTIAL VOICE COMMAND

(71) Applicant: INTEL CORPORATION, Santa Clara, CA (US)

(72) Inventors: David Kaplan, Modi'in (IL); Shahar Taite, Kfar saba (IL); Aviad Sachs, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/364,293

(22) PCT Filed: Dec. 16, 2013

(86) PCT No.: PCT/US2013/075427

§ 371 (c)(1),
(2) Date: Jun. 10, 2014

(87) PCT Pub. No.: WO2015/094162

PCT Pub. Date: Jun. 25, 2015

(65) Prior Publication Data

US 2015/0170652 A1 Jun. 18, 2015

(51) Int. Cl.
*G10L 15/00* (2013.01)
*G10L 15/22* (2006.01)

(52) U.S. Cl.
CPC .......... *G10L 15/22* (2013.01); *G10L 2015/223* (2013.01)

(58) Field of Classification Search
CPC ....... G10L 15/30; G10L 15/26; G10L 15/19; G10L 15/265; G10L 15/32; G06F 3/167; G06F 3/0482; G06F 3/165
USPC ................ 704/246, 231, 270, 270.1, 275, 9; 707/769; 715/781
See application file for complete search history.

(56) References Cited

U.S. PATENT DOCUMENTS 4,471,683 A * 9/1984 Brown .................... F41G 3/165 244/3.13
5,020,107 A 5/1991 Rohani et al.

(Continued)

OTHER PUBLICATIONS

International Search Report and Written Opinion mailed Sep. 29, 2014 for International Application No. PCT/US2013/075427, 11 pages.

(Continued)

*Primary Examiner* — Michael Colucci
(74) *Attorney, Agent, or Firm* — Schwabe, Williamson & Wyatt, P.C.

(57) ABSTRACT

Apparatus, computer-readable storage medium, and method associated with orienting a display image are described. In embodiments, a computing device may include a speech recognition module to process and recognize a voice command and a voice command module coupled with the speech recognition module. The voice command module may be configured to select, in response to recognition of an initial portion of the voice command, a plurality of voice commands having the same initial portion. The voice recognition module may be further configured to initiate execution of or stage for execution individual voice commands of the plurality of voice commands. On recognition of the entire voice command, the voice command module may be configured to select a result of the execution of an individual voice command or initiate execution of a staged for execution voice command.

24 Claims, 3 Drawing Sheets

(56) References Cited

U.S. PATENT DOCUMENTS

| | | | | |
|---|---|---|---|---|
| 6,192,339 | B1 * | 2/2001 | Cox | G10L 15/30 704/270 |
| 7,085,723 | B2 * | 8/2006 | Ross | G10L 15/30 704/251 |
| 7,426,469 | B1 * | 9/2008 | Grant | G10L 15/26 704/231 |
| 8,165,886 | B1 * | 4/2012 | Gagnon | G10L 15/26 704/275 |
| 8,219,407 | B1 * | 7/2012 | Roy | G10L 15/22 704/255 |
| 8,340,975 | B1 * | 12/2012 | Rosenberger | G10L 15/22 704/270 |
| 8,595,642 | B1 * | 11/2013 | Lagassey | G06F 3/048 704/275 |
| 8,886,521 | B2 * | 11/2014 | Patch | G10L 15/26 704/9 |
| 2002/0013701 | A1 * | 1/2002 | Oliver | G06F 3/16 704/231 |
| 2006/0069563 | A1 | 3/2006 | Ju et al. | |
| 2008/0288259 | A1 | 11/2008 | Chambers et al. | |
| 2009/0043587 | A1 | 2/2009 | Shostak | |
| 2009/0326406 | A1 * | 12/2009 | Tan | G06F 1/163 600/546 |
| 2011/0066634 | A1 * | 3/2011 | Phillips | G10L 15/22 707/769 |
| 2011/0103191 | A1 * | 5/2011 | Shin | G01S 3/8006 367/125 |
| 2011/0125503 | A1 | 5/2011 | Dong et al. | |
| 2012/0078635 | A1 * | 3/2012 | Rothkopf | G10L 15/30 704/270.1 |
| 2012/0300080 | A1 * | 11/2012 | Batson | H04N 9/3141 348/159 |
| 2013/0273853 | A1 * | 10/2013 | Reed | H04W 24/08 455/67.11 |
| 2013/0288753 | A1 * | 10/2013 | Jacobsen | G06F 3/167 455/563 |
| 2014/0122085 | A1 * | 5/2014 | Piety | G01M 7/00 704/275 |
| 2015/0110287 | A1 * | 4/2015 | Holdren | B60R 11/0247 381/86 |

OTHER PUBLICATIONS

International Preliminary Report on Patentability mailed Jun. 30, 2016 for International Application No. PCT/US2013/075427, 8 pages.

* cited by examiner

INITIATION OF ACTION UPON RECOGNITION OF A PARTIAL VOICE COMMAND

CROSS REFERENCE TO RELATED APPLICATIONS

The present application is a national phase entry under 35 U.S.C. §371 of International Application No. PCT/US2013/075427, filed Dec. 16, 2013, entitled "INITIATION OF ACTION UPON RECOGNITION OF A PARTIAL VOICE COMMAND", which designated, among the various States, the United States of America. The Specification of the PCT/US2013/075427 Application is hereby incorporated by reference.

TECHNICAL FIELD

Embodiments of the present disclosure are related to the field of data processing, and in particular, to processing of voice commands.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Speech recognition is becoming more widely used and accepted as a method of controlling computing devices, e.g., smartphones. Under the current state of technology, a voice command is not executed until the entirety of the voice command is received and identified. Waiting until the entirety of the voice command is received and identified to execute the voice command may result in a delay between when a user of the computing device begins to speak and when the voice command is executed. This delay may make the use of voice commands unsuitable for certain applications. For example, if a user wishes to capture a photograph, the user may elect to use another activation mechanism, such as, for example, a soft key, to initiate the taking of the photograph rather than a voice command because the user may miss the desired moment while the voice command is processed and identified.

DETAILED DESCRIPTION OF ILLUSTRATIVE EMBODIMENTS

A method, storage medium, and computing device for responding to voice commands are described. In embodiments, the computing device may include a speech recognition module and a voice command module coupled with the speech recognition module. The speech recognition module may be configured to process and recognize a voice command. The voice command module may be configured to select, in response to recognition of an initial portion of the voice command, a plurality of voice commands having the same initial portion. The voice command module may be configured to then initiate execution of or stage for execution individual voice commands of the plurality of voice commands. The voice command module may also be configured to select a result of execution of an individual voice command or initiate execution of a staged for execution voice command on recognition of the entire voice command. For example, the computing device may be a mobile computing device such as a smartphone and the voice command may be "take a video." In such an example, the voice command module may be configured to initiate the capture of video, upon receiving the initial portion, "take," of the voice command.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
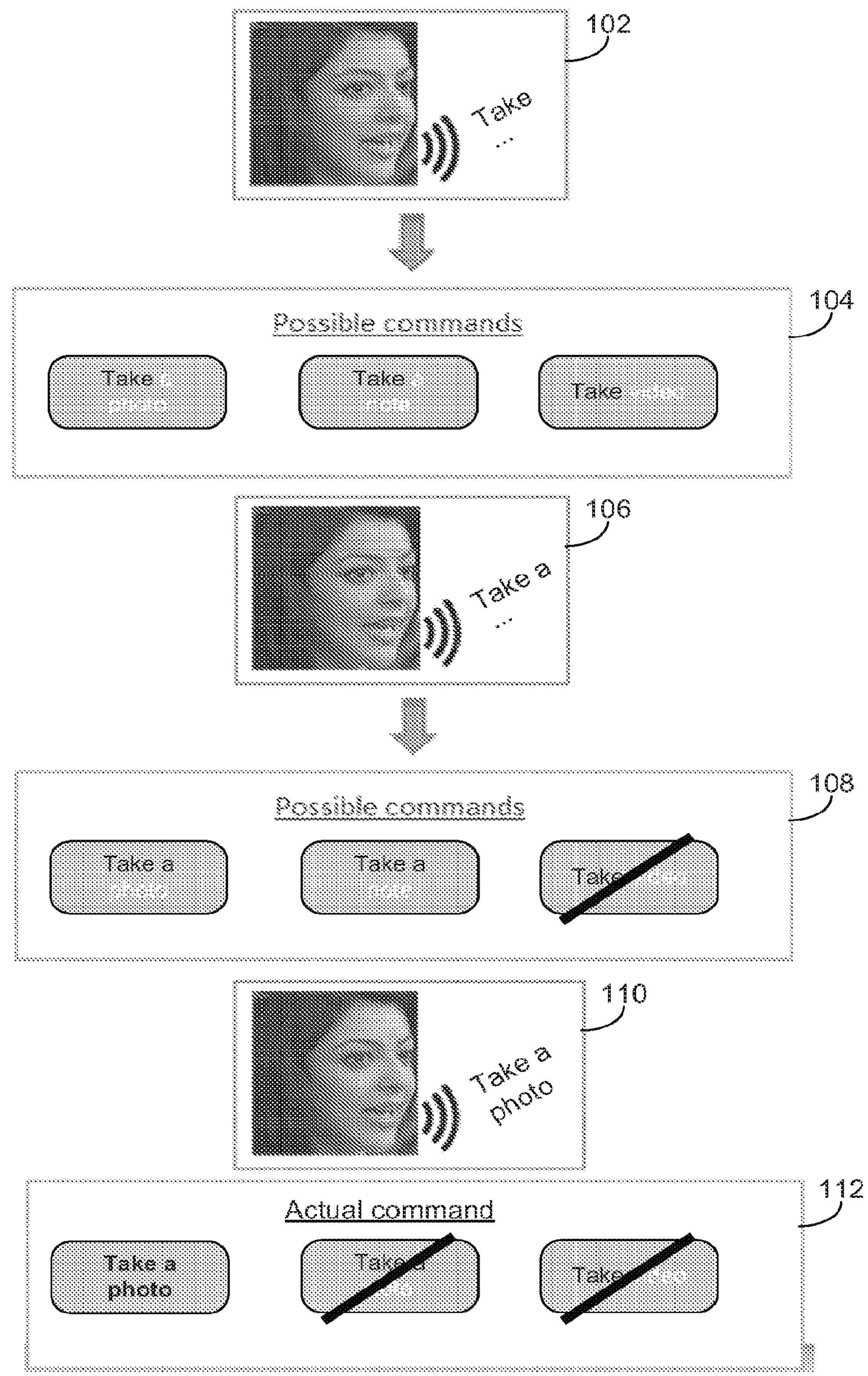
FIG. 1 depicts an illustrative interaction between a user and computing device according to some embodiments of the present disclosure.

FIG. 1 depicts an illustrative interaction between a user and a computing device according to some embodiments of the present disclosure. At 102, the user begins to give an example voice command beginning with the example word "take." Upon recognizing this initial portion of the voice command, the computing device may be configured to initiate actions with respect to a set of possible voice commands having the same initial portion. As depicted in block 104 the computing device may initiate actions with respect to the example voice commands of "take a photo," "take a note," and "take video." In embodiments, the computing device may be configured to initiate different actions depending upon the voice command. For example, with respect to the possible voice commands "take a photo" and "take video," the computing device may be configured to immediately execute both of these voice commands to initiate the capture of images utilizing a camera coupled with the computing device. With respect to the command "take a note," the computing device may be configured to merely stage this command for execution as such a command may not require immediate execution. As used herein, staged for execution may refer to any preliminary actions or data gathering that may occur prior to execution of the associated possible voice command.

The computing device may be configured to differentiate between those voice commands that need immediate execution and those voice commands that merely need to be staged for execution. This may be accomplished, for example, through a setting associated with the voice command that may indicate that the voice command should be executed or may indicate that the voice command should be staged for execution. This setting may be controlled by the user, the producer of the application associated with the voice command, or the producer of the computing device. It will be appreciated that the above scenario is merely meant to be illustrative and that any method of differentiating between those voice commands that are to be executed and those that are to be staged for execution is contemplated by this disclosure. Further embodiments are discussed in reference to FIGS. 2 and 3, below.

In some embodiments, the computing device may be configured to capture additional portions of the voice command and may utilize these additional portions to narrow the set of possible voice commands. For example, in 106 the user of the computing device gives a subsequent portion of the voice command "a." Upon receiving the subsequent portion of the voice command, the computing device may be configured to eliminate any actions associated with voice commands that do not match this subsequent portion and may allow the remaining voice commands that do match the subsequent portion to continue executing or to remain staged for execution. As depicted here, the voice command "take video" no longer matches the recognized portions of the voice command and therefore the execution of this voice command has been terminated as depicted by the line crossing through this voice command.

Upon recognizing the entire voice command, the computing device, according to some embodiments, may be configured to terminate the execution of any voice commands that do not match the entire voice command or may purge from staging any voice commands that were staged for execution but do not match the entire voice command. The computing device may be further configured to retrieve any results of the execution of the voice command that matches the entire voice command, where execution has been initiated, or initiate execution of a staged for execution voice command that matches the entire voice command.

Figure 2:
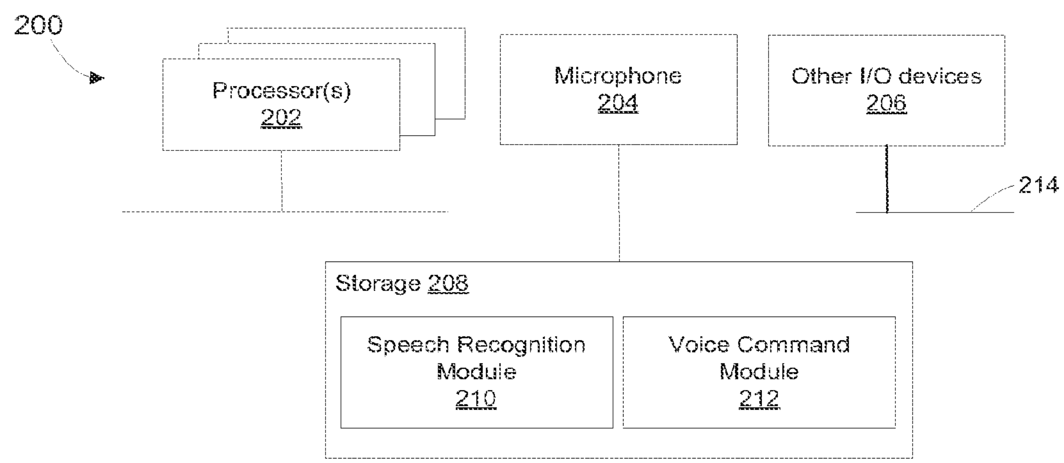
FIG. 2 depicts an illustrative computing device according to some embodiments of the present disclosure.

FIG. 2 depicts an illustrative configuration of a computing device 200 according to some embodiments of the disclosure. Computing device 200 may be any type of computing device including a portable computing device, such as a smart phone, tablet, ultrabook, ebook, laptop computer, etc., or a stationary computing device, such as a desktop computer or kiosk computing device. It will be appreciated that the computing devices mentioned above are merely illustrative examples that are not to be viewed as limiting this disclosure. This disclosure is equally applicable regardless of the computing device's form.

Computing device 200 may comprise processor(s) 202, microphone 204, other input/output (I/O) devices 206, and storage 208 containing speech recognition module 210 and voice command module 212. Processor(s) 202, microphone 204, other input/output (I/O) devices 206, and storage 208 may all be coupled together utilizing system bus 214.

Processor(s) 202 may be comprised of a single processor or multiple processors. In multiple processor embodiments, the multiple processors may be of the same type, i.e. homogeneous, or may be of differing types, i.e. heterogeneous and may include any type of single or multi-core processors. This disclosure is equally applicable regardless of type and/or number of processors.

Microphone 204 may be any device configured to capture audio input. Microphone 204 may be incorporated into computing device 200 or may be peripherally connected to computing device 200 through any type of wired and/or wireless connection. This disclosure is equally applicable regardless of the type of microphone.

In embodiments, storage 208 may be any type of computer-readable storage medium or any combination of differing types of computer-readable storage media. Storage 208 may include volatile and non-volatile/persistent storage. Volatile storage may include e.g., dynamic random access memory (DRAM). Non-volatile/persistent storage may include, but is not limited to, a solid state drive (SSD), a magnetic or optical disk hard drive, flash memory, or any multiple or combination thereof.

In embodiments speech recognition module 210 and voice command module 212 may be implemented as software, firmware, or any combination thereof. In some embodiments, speech recognition module 210 and voice command module 212 may comprise one or more instructions that, when executed by processor(s) 202, cause computing device 200 to perform one or more operations of processes described herein.

In embodiments, speech recognition module 210 may be configured to recognize initial and subsequent portions of a voice command. This may be accomplished by analyzing audio captured by microphone 204. In embodiments, voice command module 212 may be configured to initiate one or more actions based upon a recognized portion of the voice command. Such actions may include, but are not limited to, selecting possible voice commands, initiating execution of a voice command, staging a voice command for execution, terminating the execution of a voice command, and/or purging a staged for execution voice command.

In embodiments, selecting possible voice commands may be based upon an initial portion of the voice command recognized by speech recognition module 210. In embodiments, selected possible voice commands may all have the same initial portion. In some embodiments, selecting possible voice commands may be further based on a context of the computing device and/or a user of the computing device. Illustrative contexts are discussed further in reference to FIG. 3, below.

Once possible voice commands have been selected by voice command module 212, voice command module 212 may be configured to initiate execution of selected voice commands and/or stage for execution selected voice commands. In embodiments, whether a voice command is executed or staged for execution may be dependent upon a setting associated with the voice command determined by, for example, a user of the computing device, the producer of the application associated with the voice command, or the producer of the computing device. This determination may also be based upon whether the voice command initiates any external manifestations, such as making a phone call or playing music. In some embodiments, this determination may be based upon whether a single version of the voice command may be determined from the recognized portion of the voice command. For instance, when giving a voice command to make a phone call any contact name may complete the voice command and therefore each contact may be a different version of the voice command. In such a scenario, the voice command module may be configured to merely stage for execution the possible versions of the voice command and may be further configured to wait until a single contact may be determined from the recognized portion of the voice command prior to initiating execution of the voice command.

Upon speech recognition module 210 recognizing a subsequent portion of the voice command, voice command module 212 may be configured to terminate execution of any executing voice commands that do not have the same subsequent portion as that recognized. In instances where the possible voice command has been staged for execution the voice command module may be configured to purge any staged for execution voice commands that do not have the same subsequent portion as that recognized.

Once speech recognition module 210 has recognized all portions of the voice command, voice command module 212 may be configured to terminate execution of any executing voice commands or purge any staged for execution voice commands that do not match the recognized voice command. Voice command module 212 may be further configured to either select a result of an executed voice command or initiate execution of a staged for execution voice command that matches the recognized voice command, depending upon the previous action taken with respect to the voice command.

Figure 3:
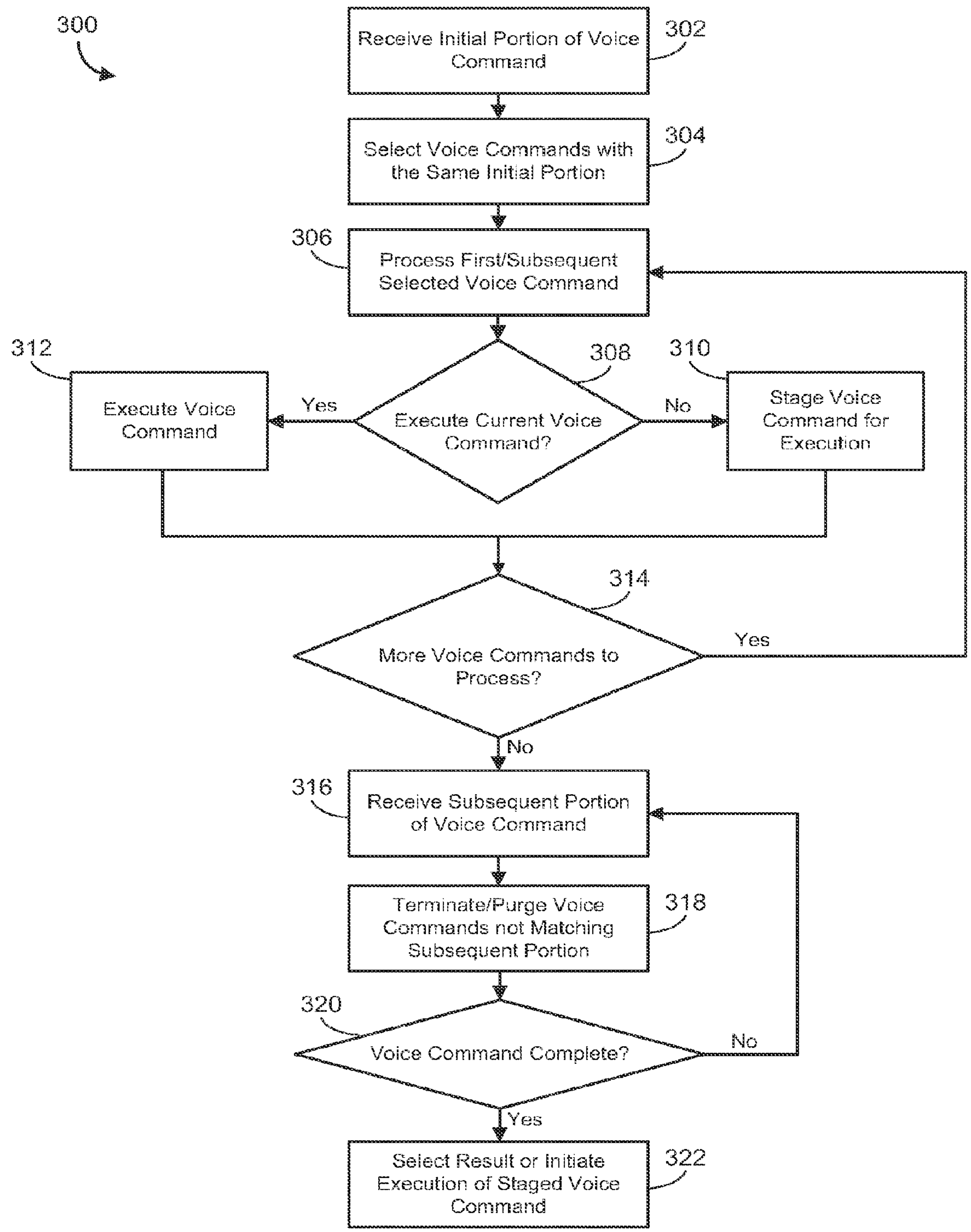
FIG. 3 depicts an illustrative process flow according to some embodiments of the present disclosure.

FIG. 3 depicts an illustrative process flow of a computing device according to some embodiments of the present disclosure. The process may begin in block 302 where the computing device may receive an initial portion of a voice command, such as that depicted in 102 of FIG. 1. The initial portion of the voice command may, for example, be a sound of a first letter or a first syllable of the voice command. It will be appreciated, however, that any initial portion of the voice command that is less than the complete voice command, is contemplated by this disclosure. The computing device may receive the voice command through a microphone, such as microphone 204 of FIG. 2. In embodiments, the voice command may be processed by a speech recognition module and/or a voice command module, such as speech recognition module 210 and voice command module 212 of FIG. 2.

In block 304, the computing device may select a number of possible voice commands that have the same initial portion as that received in block 302. This may be accomplished, for example, by analyzing the individual voice commands to select possible voice commands having the same initial portion. In another example, possible voice commands having the same initial portion may be related through a data structure, such as a tree data structure. In such a data structure, the root node of the tree may correlate with the initial portion of a group of voice commands. The group of voice commands may be represented by the leaves of the tree. In addition, each level of the tree may correlate with each subsequent portion of the voice command, this is discussed further below. The above discussed mechanisms, for correlating possible voice commands with an initial portion of a voice command, are meant to be illustrative and should not be limiting of this disclosure. It will be appreciated that any such mechanism capable of correlating possible voice commands when an initial portion of the voice command is recognized is contemplated by this disclosure.

In some embodiments, not depicted here, the selection of possible voice commands may be further narrowed based upon a context of the computing device and/or a context of a user of the computing device. Such context sensitive voice command selection may be based upon any number of factors, including, but not limited to, time, location, or orientation of the computing device. For instance, if the user is at the user's place of employment and is restricted from performing certain actions while there, e.g., taking pictures or video, then voice commands related to capturing images may not be selected as possible voice commands. This may be accomplished, for instance, by determining whether the computing device is at the user's place of employment utilizing, for example, a global positioning system (GPS) to determine a location of the computing device.

In some embodiments, a context of the user may be based upon, for example, one or more applications executing on the computing device and/or data sources available to the computing device. For example, the computing device may retrieve data from the user's calendar and make a determination that the user is currently in a meeting. Based upon this determination the selection of possible voice commands may be appropriately restricted. In embodiments, the context sensitivity and corresponding possible voice commands may be defined by the user of the computing device via one or more settings associated with the various contexts and/or possible voice commands. The above described contexts are meant to be illustrative and should not be viewed as limiting of this disclosure.

In block 306, a selected voice command may be processed. The voice command may be the first selected voice command or a subsequent selected voice command depending on the stage of processing the voice commands. The first selected voice command may be any voice command of the selected voice commands. For example, the voice commands may be processed in the order in which they were selected, in alphabetical order, ordered by frequency of usage, etc. While depicted here as occurring after selection of voice commands in block 304, in some embodiments, block 306 may occur in conjunction with the voice command selection in block 304. In such embodiments, the voice commands may be processed as they are selected.

In block 308, a determination may be made regarding whether the current voice command, of the selected voice commands, is to be executed. This determination may be made by retrieving a setting associated with the voice command. This setting may be user defined or defined by a hardware or software provider. In some embodiments, this setting may be determined based upon whether the voice command causes any external manifestations to occur. For example, if the voice command pertains to playing music, the voice command may be set to prevent execution of the voice command, while processing the voice command, because the voice command may cause an external manifestation, e.g., the playing of music. In other embodiments, whether a voice command is to be executed may be dependent upon whether a single version of the voice command may be determined from the portion of the voice command already received. For instance, returning to the example of playing music, the voice command may not be executed until a specific song, album, or playlist is determined from the voice command. This may help prevent the computing device from triggering multiple actions for a single voice command, such as triggering the playback of all songs available to the computing device upon receiving the initial portion of a corresponding voice command.

If the current voice command is not to be executed then the process may proceed to block 310 where the voice command is staged for execution. To stage a voice command for execution may involve gathering of data or initiating any actions that may occur prior to execution of the voice command. For instance, if the voice command is to initiate a phone call, the phone numbers of possible recipients may be retrieved to stage the voice command for execution.

If the current voice command is to be executed then the process may proceed to block 312. At block 312 the computing device may initiate execution of the voice command. In embodiments, the computing device may be configured to buffer results of the execution of the voice command. In some embodiments, the computing device may be configured to execute voice commands in parallel utilizing multiple processors and/or multiple processor cores. In other embodiments, the voice commands may be placed in a queue to be executed in the order the voice commands are processed.

Regardless of whether the voice command is executed via block 312 or staged for execution via block 310, the process may proceed to block 314. At block 314 a determination may be made as to whether there are more voice commands of the selected voice commands to process. If there are additional voice commands to process then the process may return to block 306 where the next voice command may be processed. If, however, there are no more voice commands to process the process may continue to block 316.

At block 316, a subsequent portion of the voice command may be received, such as that depicted in 106 of FIG. 1. In some embodiments, not depicted here, the subsequent portion of the voice command may be the remaining portion of the voice command. For example, after the initial portion is received all possible voice commands may be processed, but no further processing may take place until the voice command is complete. In such embodiments, once the voice command is complete, the execution of any voice commands not matching the completed voice command may be terminated and any results that may have been buffered may be deleted or any voice commands staged for execution that do not match the complete voice command may be purged.

In other embodiments, the subsequent portion of the voice command may be, for example, a next letter sound or syllable of the voice command. In other embodiments, once a subsequent portion of the voice command is recognized, the computing device may, in block 318, terminate execution of, or purge from staging, any voice commands that no longer match the recognized portions of the voice command. This may be accomplished, for example, by analyzing the selected individual voice commands to determine a subset of possible voice commands that have a subsequent portion that does not match the recognized subsequent portion of the voice command.

In an example, the subset of possible voice commands having a different subsequent portion may be determined utilizing a data structure, such as that discussed above in reference to block 304. For instance, the tree data structure, discussed above, could be utilized to quickly determine the subset of voice commands that do not match the recognized subsequent portion. As discussed above, the root node of the tree may correlate with the initial portion of a group of voice commands where the leaves of the tree correlate with completed voice commands. Each subsequent portion of the voice command may traverse a branch of the tree to a node matching the subsequent portion. Thus with the receipt of each subsequent portion of the voice command a branch of the tree may be traversed, the leaves of any branches not traversed may represent voice commands that do not match the recognized subsequent portion and these voice commands could be terminated or purged from staging. The above discussed mechanisms for correlating the possible voice commands as a subsequent portion of a voice command is recognized are meant to be illustrative and should not be limiting of this disclosure. It will be appreciated that any such mechanism capable of identifying possible voice commands given a subsequent portion of the voice command is contemplated by this disclosure.

As discussed above, the computing device may receive the voice command through a microphone, such as microphone 204 of FIG. 2. In embodiments, the voice command may be processed by a speech recognition module and a voice command module, such as speech recognition module 210 and voice command module 212 of FIG. 2.

At block 320, a determination may be made as to whether the voice command is complete. If the voice command is not complete then the process may return to block 316 where another subsequent portion of the voice command may be received. If the voice command is complete, then the process may proceed to block 322 where a result of the voice command may be selected, if the completed voice command was executed in block 312, or, if the voice command was staged for execution in block 310, the staged for execution voice command may be executed.

For the purposes of this description, a computer-usable or computer-readable medium can be any medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Some non-limiting examples are:

Example 1 is a computing device for responding to voice commands, comprising: a speech recognition module to process and recognize a voice command; and a voice command module coupled with the speech recognition module to: select, in response to recognition of an initial portion of the voice command, a plurality of voice commands having the same initial portion; initiate execution of or stage for execution individual voice commands of the plurality of voice commands; and select a result of the execution of an individual voice command or initiate execution of a staged for execution voice command on recognition of the entire voice command.

Example 2 may include the subject matter of Example 1, wherein the voice command module is further to: select a subset of the plurality of voice commands, in response to recognition of a subsequent portion of the voice command; and terminate execution or purge staged for execution voice commands of the subset, wherein individual voice commands of the subset have different subsequent portions than the recognized subsequent portion.

Example 3 may include the subject matter of Example 2, wherein to terminate execution or purge staged for execution voice commands of the subset further includes clearing individual buffers associated with respective voice commands of the subset.

Example 4 may include the subject matter of Example 1, wherein to select a plurality of voice commands having the same initial portion is further based on a context of the computing device.

Example 5 may include the subject matter of Example 4, wherein the context is one of time, location, or orientation of the computing device.

Example 6 may include the subject matter of any one of Examples 1-5, wherein the initial portion of the voice command is a first syllable of the voice command.

Example 7 is a computer-implemented method for responding to voice command, comprising: selecting, in response to recognition of an initial portion of the voice command, a plurality of voice commands having the same initial portion; initiating execution of or staging for execution individual voice commands of the plurality of voice commands; and selecting a result of the execution of an individual voice command or initiating execution of a staged for execution voice command on recognition of the entire voice command.

Example 8 may include the subject matter of Example 7, further comprising: selecting a subset of the plurality of voice commands, in response to recognition of a subsequent portion of the voice command; and terminating execution or purging staged for execution voice commands of the subset, wherein individual voice commands of the subset have different subsequent portions than the recognized subsequent portion.

Example 9 may include the subject matter of Example 8, wherein terminating execution or purging staged for execution voice commands of the subset further includes clearing individual buffers associated with respective voice commands of the subset.

Example 10 may include the subject matter of Example 7, wherein selecting a plurality of voice commands having the same initial portion is further based on a context of the computing device.

Example 11 may include the subject matter of Example 10, wherein the context is one of time, location, or orientation of the computing device.

Example 12 may include the subject matter of any one of Examples 7-11, wherein the initial portion of the voice command is a first syllable of the voice command.

Example 13 is one or more computer-readable media having instructions stored thereon which, when executed by a computing device, provide the computing device with a voice command module to: select, in response to recognition of an initial portion of the voice command, a plurality of voice commands having the same initial portion; initiate execution of or stage for execution individual voice commands of the plurality of voice commands; and select a result of the execution of an individual voice command or initiate execution of a staged for execution voice command on recognition of the entire voice command.

Example 14 may include the subject matter of Example 13, wherein the voice command module is further to: select a subset of the plurality of voice commands, in response to recognition of a subsequent portion of the voice command; and terminate execution or purge staged for execution voice commands of the subset, wherein individual voice commands of the subset have different subsequent portions than the recognized subsequent portion.

Example 15 may include the subject matter of Example 14, wherein to terminate execution or purge staged for execution voice commands of the subset further includes clearing individual buffers associated with respective voice commands of the subset.

Example 16 may include the subject matter of Example 13, wherein to select a plurality of voice commands having the same initial portion is further based on a context of the computing device.

Example 17 may include the subject matter of Example 16, wherein the context is one of time, location, or orientation of the computing device.

Example 18 may include the subject matter of any one of Examples 13-17, wherein the initial portion of the voice command is a first syllable of the voice command.

Example 19 is an apparatus for responding to voice command, comprising: means for selecting, in response to recognition of an initial portion of the voice command, a plurality of voice commands having the same initial portion; means for initiating execution of or staging for execution individual voice commands of the plurality of voice commands; and means for selecting a result of the execution of an individual voice command or initiating execution of a staged for execution voice command on recognition of the entire voice command.

Example 20 may include the subject matter of Example 19, further comprising: means for selecting a subset of the plurality of voice commands, in response to recognition of a subsequent portion of the voice command; and means for terminating execution or purging staged for execution voice commands of the subset, wherein individual voice commands of the subset have different subsequent portions than the recognized subsequent portion.

Example 21 may include the subject matter of Example 20, wherein the means for terminating execution or purging staged for execution voice commands of the subset further includes means for clearing individual buffers associated with respective voice commands of the subset.

Example 22 may include the subject matter of Example 19, wherein selecting a plurality of voice commands having the same initial portion is further based on a context of the computing device.

Example 23 may include the subject matter of Example 22, wherein the context is one of time, location, or orientation of the computing device.

Example 24 may include the subject matter of any one of Examples 19-23, wherein the initial portion of the voice command is a first syllable of the voice command.

What is claimed is:

1. A computing device comprising:

one or more processors;

a speech recognition module to be operated by the processors to process and recognize a voice command; and a voice command module to be operated by the processor to:

select, in response to recognition of an initial portion of the voice command, a plurality of voice commands having the same initial portion;

initiate execution of the plurality of voice commands; and select a result of the execution of an individual voice command from a plurality of execution results of the plurality of voice commands on recognition of the entire voice command.

2. The computing device of claim 1, wherein the voice command module is further to:

select a subset of the plurality of voice commands, in response to recognition of a subsequent portion of the voice command; and terminate execution of the voice commands of the subset, wherein individual voice commands of the subset have different subsequent portions than the recognized subsequent portion.

3. The computing device of claim 2, wherein to terminate execution of the voice commands of the subset further includes clearing individual buffers associated with respective voice commands of the subset.

4. The computing device of claim 1, wherein to select a plurality of voice commands having the same initial portion is further based on a context of the computing device.

5. The computing device of claim 4, wherein the context is one of time, location, or orientation of the computing device.

6. The computing device of claim 1, wherein the initial portion of the voice command is a first syllable of the voice command.

7. A computer-implemented method comprising:

selecting, by a voice command module, in response to recognition of an initial portion of the voice command, a plurality of voice commands having the same initial portion;

initiating, by the voice command module, execution of the plurality of voice commands; and selecting, by the voice command module, a result of the execution of an individual voice command from a plurality of execution results of the plurality of voice commands on recognition of the entire voice command.

8. The computer-implemented method of claim 7, further comprising:

selecting, by the voice command module, a subset of the plurality of voice commands, in response to recognition of a subsequent portion of the voice command; and terminating, by the voice command module, execution of the voice commands of the subset, wherein individual voice commands of the subset have different subsequent portions than the recognized subsequent portion.

9. The computer-implemented method of claim 8, wherein terminating execution of the voice commands of the subset further includes clearing individual buffers associated with respective voice commands of the subset.

10. The computer-implemented method of claim 7, wherein selecting a plurality of voice commands having the same initial portion is further based on a context of a computing device.

11. The computer-implemented method of claim 10, wherein the context is one of time, location, or orientation of the computing device.

12. The computer-implemented method of claim 7, wherein the initial portion of the voice command is a first syllable of the voice command.

13. One or more non-transitory computer-readable media having instructions stored thereon which, when executed by a computing device, provide the computing device with a voice command module to:

select, in response to recognition of an initial portion of a voice command, a plurality of voice commands having the same initial portion;

initiate execution of the plurality of voice commands; and select a result of the execution of an individual voice command from a plurality of execution results of the plurality of voice commands on recognition of the entire voice command.

14. The non-transitory computer-readable media of claim 13, wherein the voice command module is further to:

select a subset of the plurality of voice commands, in response to recognition of a subsequent portion of the voice command; and terminate execution of the voice commands of the subset, wherein individual voice commands of the subset have different subsequent portions than the recognized subsequent portion.

15. The non-transitory computer-readable media of claim 14, wherein to terminate execution of the voice commands of the subset further includes clearing individual buffers associated with respective voice commands of the subset.

16. The non-transitory computer-readable media of claim 13, wherein to select a plurality of voice commands having the same initial portion is further based on a context of the computing device.

17. The non-transitory computer-readable media of claim 16, wherein the context is one of time, location, or orientation of the computing device.

18. The non-transitory computer-readable media of claim 13, wherein the initial portion of the voice command is a first syllable of the voice command.

19. An apparatus comprising:

means for selecting, in response to recognition of an initial portion of a voice command, a plurality of voice commands having the same initial portion;

means for initiating execution of the plurality of voice commands; and means for selecting a result of the execution of an individual voice command from a plurality of execution results of the plurality of voice commands on recognition of the entire voice command.

20. The apparatus of claim 19, further comprising:

means for selecting a subset of the plurality of voice commands, in response to recognition of a subsequent portion of the voice command; and means for terminating execution of the voice commands of the subset, wherein individual voice commands of the subset have different subsequent portions than the recognized subsequent portion.

21. The apparatus of claim 20, wherein the means for terminating execution of the voice commands of the subset further includes means for clearing individual buffers associated with respective voice commands of the subset.

22. The apparatus of claim 19, wherein selecting a plurality of voice commands having the same initial portion is further based on a context of a computing device.

23. The apparatus of claim 22, wherein the context is one of time, location, or orientation of the computing device.

24. The apparatus of claim 19, wherein the initial portion of the voice command is a first syllable of the voice command.

* * * * *